United States Patent Office 3,159,524
Patented Dec. 1, 1964

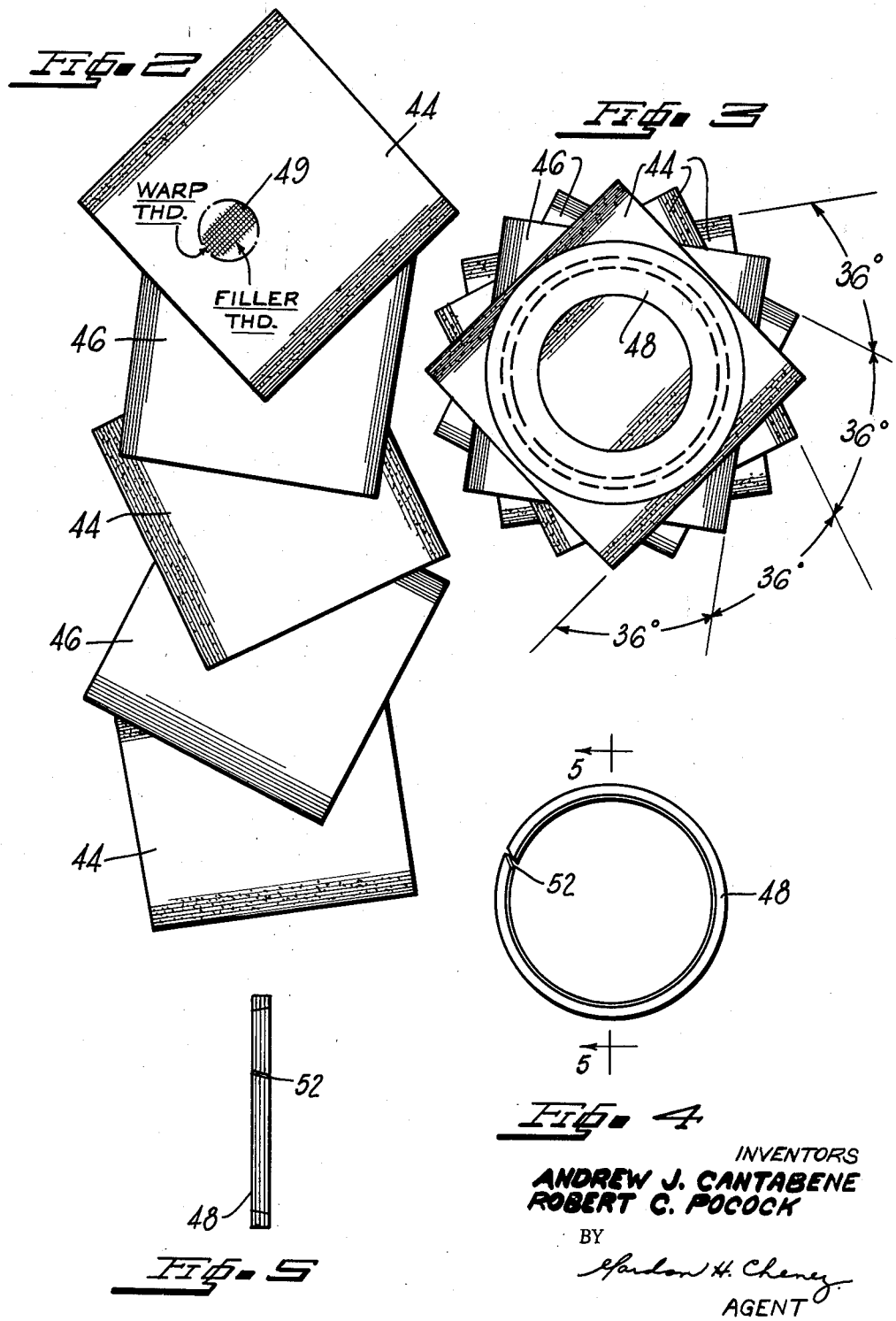

3,159,524
LAMINATED BAFFLE RING AND METHOD
OF MAKING SAME
Andrew J. Cantabene and Robert C. Pocock, South Bend, Ind., assignors to The Bendix Corporation, South Bend, Ind., a corporation of Delaware
Filed Aug. 25, 1961, Ser. No. 133,976
4 Claims. (Cl. 161—58)

This invention relates to baffles of the flame barrier type and, in particular, relates to a baffle of the flame barrier type for obstructing flow of a pressurized incandescent gas such as the hot motive gas generated by a rocket motor.

One conventional method of controlling the direction of flight of a jet propelled vehicle such as a rocket missile is through the use of a movable thrust nozzle which may be pivoted relative to the longitudinal axis of the rocket to thereby vary the thrust vector of the nozzle accordingly. One such arrangement of thrust vector control is disclosed in copending application Serial No. 806,505, filed April 15, 1959, in the name of Wendell E. Eldred (common assignee). Most, if not all, movable thrust nozzle arrangements proposed by the prior art require seals of one type or another between the movable nozzle and the rocket body structure upon which the nozzle is movably mounted. Due to the limited ability of existing materials, suitable for use as seals, to withstand the heat generated in the region of the movable nozzle by the high temperature and high pressure gas exhausted from the rocket motor combustion chamber, considerable effort has been expended by industry in an attempt to devise a sealing arrangement using known materials which is capable of surviving the high temperature and high pressure environment of a rocket nozzle without failing within a relatively short time. The flexible seal arrangement disclosed in copending application Serial No. 806,505 is one example of seals recently developed in the art which are feasible and which provide maximum protection for as long as possible during the combustion process occurring in the rocket motor.

It has been found that the life of a seal such as that disclosed in copending application Serial No. 806,505 can be greatly extended by providing a baffle or flame barrier in the path of the motive incandescent gas which tends to migrate toward the seal which gas in a rocket motor may be in the order of 5000° F. temperature and 500 p.s.i.a. pressure, to thereby impede the transmission of heat energy to the seal. However, it is apparent that the baffle or flame barrier used in such an application must possess unusually high heat resistant quality coupled with high mechanical strength if it is to be capable of withstanding the extreme temperature and pressure of the impinging hot motive gas for any reasonable length of time. It is therefore an object of this invention to provide a baffle having exceptionally good ablation resistant quality as well as a high degree of mechanical strength.

It is another object of the present invention to provide an effective baffle for use in a high temperature and/or high pressure environment.

It is still another object of the present invention to provide a simple and relatively inexpensive baffle for impeding the flow of an incandescent gas.

It is an important object of the present invention to provide a baffle or flame barrier for use in the high temperature and high pressure environment of a rocket thrust nozzle.

Other objects and advantages will be apparent from the following description taken in connection with the accompanying drawings wherein:

FIGURE 2 is an exploded view of the plurality of layers of graphitized cloth and high silica content cloth from which the present invention is formed;

FIGURE 3 is a plan view of the plurality of layers of cloth shown in FIGURE 2 after the layers of cloth have been bonded together by the application of heat and pressure;

FIGURE 4 is a plan view of the present invention; and

FIGURE 5 is a sectional view taken on line 5—5 of FIGURE 4.

Figure 1:
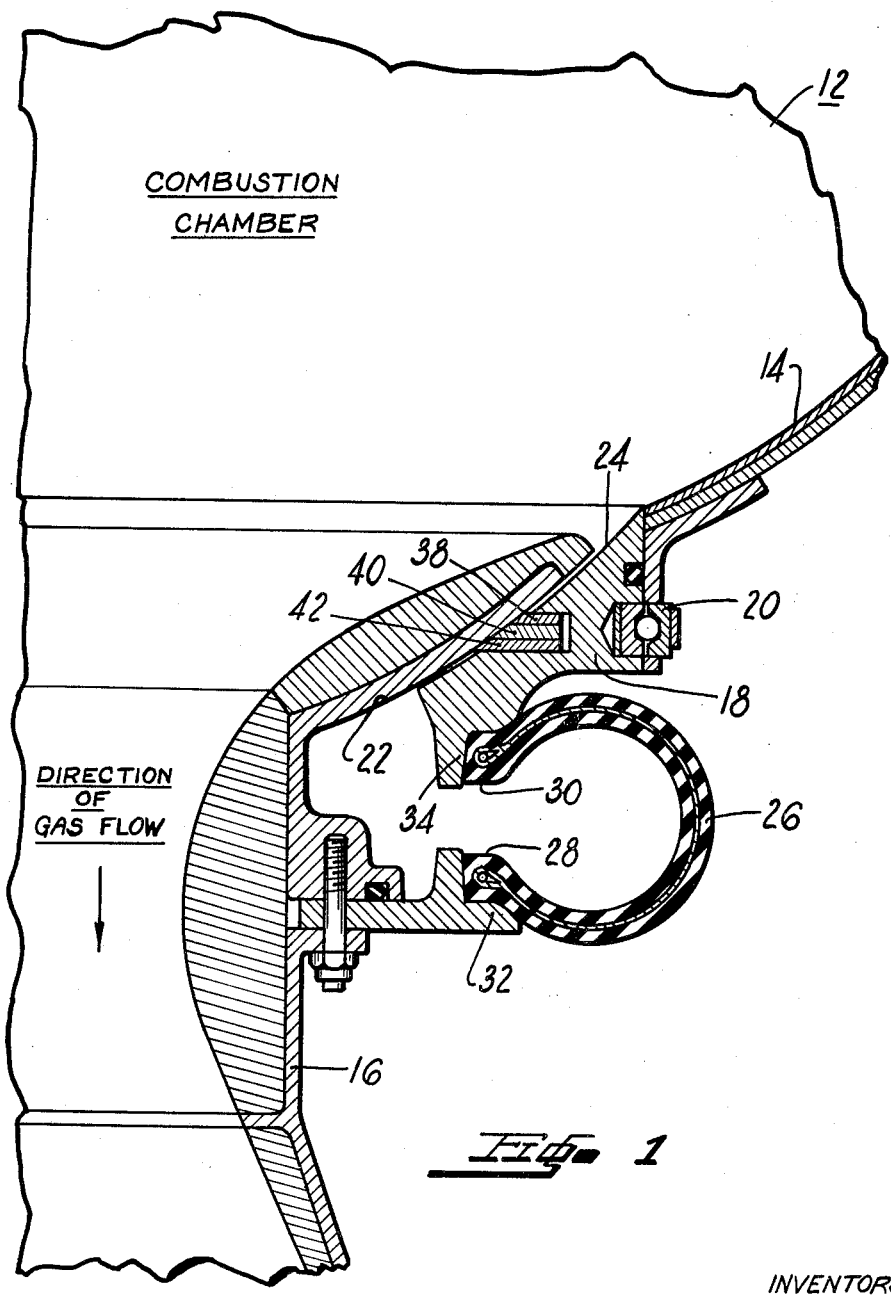
FIGURE 1 represents a quarter sectional view of a movable rocket nozzle embodying the present invention.

Referring to FIGURE 1, numeral 12 designates the aft portion of a rocket missile having a casing 14 of generally circular form in which either liquid or solid fuel, not shown, is stored forward of a converging diverging thrust nozzle 16. The combustion process occurs within the casing 14 in a conventional manner well understood by those persons skilled in the art and the resulting high temperature, high pressure gas expands through the thrust nozzle 16 to the atmosphere thereby generating propelling thrust. The temperature and pressure of the gas generated during the combustion process reach relatively high values which are in the order of 5000° F. and 500 p.s.i.a., respectively.

An annular support member 18 is fixedly secured to casing 14 by any suitable means which may include a locking ring mechanism 20 which is adapted to be released on demand to thereby permit the annular support member 18 and thrust nozzle 16 attached thereto to fall free from the casing 14. The thrust nozzle 16 is provided with an annular convex bearing surface 22 which slidably engages a complementary annular concave bearing surface 24 formed on the annular support member 18. Thus, the thrust nozzle 16 is pivotable about a point on the longitudinal axis of the casing 14, not shown. The thrust nozzle 16 may be actuated by any suitable power apparatus, not shown, connected to control the pivotal movement of the nozzle 16. An annular flexible sealing member 26 encircles the thrust nozzle 16 and is provided with relatively movable bead portions 28 and 30 which engage flanged member 32 secured to the thrust nozzle 16 and flanged member 34 formed on annular support member 18, respectively. Reference is made to the aforementioned copending application Serial No. 806,505 for a detailed description of the rocket apparatus discussed thus far which represents but one environment in which the present invention may be used to advantage.

In general, to promote an understanding of the present invention and its function, it is sufficient that it be understood that the high temperature and high pressure gas generated during the combustion process upstream from the thrust nozzle 16 acts against the converging portion of the thrust nozzle 16 forcing the nozzle 16 rearwardly thereby maintaining convex bearing surface 22 in contact with concave bearing surface 24. Initiation of the combustion process results in high temperature and high pressure gas flow between the mating bearing surfaces 22 and 24 into the chamber defined by annular flexible sealing member 26 which, by virtue of the gas pressure acting thereagainst, expands thereby forcing the bead portions 28 and 30 into sealed engagement with their respective flanged members 28 and 30. In this manner the annular sealing member 26 provides an effective flexible seal which prevents the hot motive gas upstream therefrom from escaping to the atmosphere. It will be noted that, upon pressurization of the annular sealing member 26 in the above mentioned manner, there is substantially no further flow of gas between the mating bearing surfaces 22 and 24 by virtue of the inert volume of gas trapped by the annular sealing member 26. Therefore, the amount of heat transferred to the annular sealing member 26 is reduced significantly which results in a corresponding longer seal life. However, it has been found that the high pressure incandescent gas upstream from the nozzle 16 tends to migrate between the mating bearing surfaces 22 and 24 into the chamber defined by the annular sealing member 26 whereupon the temperature of the inert gas volume is raised accordingly which, in turn, causes a corresponding reduction in the life of the annular sealing member 26. This problem necessitates a baffle ring or flame barrier having the qualities of high ablation resistance and high mechanical strength to withstand the temperature and pressure of the gas generated upstream from the thrust nozzle 16.

Referring to FIGURE 1, the present invention includes a baffle ring 36 made from three laminated annular rings 38, 40, and 42 disposed side by side in a recess 44 formed in the annular support member 18. The radial inner edges of the annular rings 38, 40, and 42 bear against the bearing surface 22 and are formed to substantially match the convex surface thereof. It will be understood that the spacing between the bearing surfaces 22 and 24 is shown somewhat exaggerated and that in actual practice the spacing is a relatively small dimension such that the radial inner edges of the annular rings 38, 40, and 42 extend only a small distance beyond the concave bearing surface 24.

Referring to FIGURES 2 and 3, there is shown a plurality of layers of graphite cloth 44 and high silica content cloth 46 which are impregnated with a resin for bonding the cloths together under heat and pressure as will be described hereinafter. Any suitable resin such as conventional phenolic resin may be used to impregnate the graphite and silica cloths. The graphite cloth 44 is made from a woven material sold under the trade name of Dacron which material is heated to a given temperature in the absence of air for a prolonged period of time to thereby convert the material to graphite. The high silica content cloth 46 is a fiberglass cloth which is acid leached to remove metallic impurities leaving substantially pure silicon dioxide. The graphite cloth and the silica cloth, 44 and 46, are both available commercially from various manufacturers which specialize in this general field.

Each of the laminated annular rings 38, 40, and 42 is constructed from alternately arranged layers of graphite cloth 44 and silica cloth 46 which are bonded together under heat and pressure to form an annular ring 48 from which the annular ring is machined. As shown in FIGURE 2, the outermost layers of cloth are graphite cloth 44 with silica cloth 46 alternating with graphite cloth therebetween. The layers of cloth 44 and 46 are assembled in parallel one on top of the other with each succeeding layer of cloth rotated with respect to the previous layer of cloth about a common central axis $a-a$ so as to establish equal angular spacing between the warp threads of adjacent layers of cloth. The warp threads are designated by the straight lines extending between parallel edges of each layer of cloth. In the case of the five layers of graphite and silica cloth, 44 and 46, shown in FIGURE 2, the angular spacing between adjacent layers of cloth is thirty-six degrees which spacing is determined by dividing the total number of layers of graphite and silica cloth into one-hundred and eighty degrees. Since the warp and filler threads in any given layer of cloth run at right angles to each other, tensile strength in the plane of the cloth is greater in the directions of the warp threads and filler threads whereas the tensile strength is somewhat weaker at any angle thereto. This variation in tensile strength will occur in a single layer of cloth or in a plurality of layers of cloth arranged one on top the other with their warp threads running parallel. It will be noted that the angular spacing of the layers of graphite and silica cloth produces uniformity in strength and thread length in all segments of the laminae and thus the annular rings 38, 40 and 42 cut therefrom in the following described manner. In this manner, stress concentration developed in the laminated annular rings 38, 40, and 42 in response to the high temperature and pressure environment in which they operate is reduced to a minimum which, in turn, results in a corresponding reduction in twisting or warping of the annular rings 38, 40, and 42 under high temperature and/or pressure. In addition to producing uniformity in strength and thread length in all segments of the laminae, the angular spacing of the layers of cloth, 44 and 46, results in the warp threads and filler threads of each succeeding layer of cloth, 44 or 46, extending across the interstices defined by the warp and filler threads of the adjacent layer of cloth. Referring to FIGURE 2, the interstices one of which is designated by numeral 49 defined by the warp and filler threads of the layer of graphite cloth 44 will be overlapped by the warp and filler threads of the succeeding four layers of cloth which reduces the effective area of any through passage through the laminated layers of cloth accordingly. Thus, the existence of relatively large weak areas as a result of alignment of the interstices 49 in the layers of cloth, 44 and 46, is eliminated.

If it is desired to extend the thickness of an annular ring 38, 40, or 42, additional layers of alternately arranged layers of graphite and silica cloth, 44 and 46, may be added in which case the angular spacing between adjacent layers of cloth would be decreased accordingly. After the layers of graphite cloth 44 and silica cloth 46 are arranged in the above mentioned manner, the layers of cloth are heated by any suitable heating means to a temperature sufficient to cause the resin with which the layers of graphite and silica cloth are impregnated to flow and compressed between a flat bed and an annular ram of a press, not shown with sufficient pressure to integrate the layers of graphite and silica cloth. After the layers of cloth are integrated by the heating and compressing operation, the resulting laminated layers of graphite and silica cloth are allowed to cool whereupon one annular ring, shown in dashed outline in FIGURE 3, is cut from the ring 48 by a conventional machining operation which includes cutting the radial inner edges of the annular ring at an angle to substantially conform to the convex bearing surface 22. Each of the annular rings 38, 40, and 42 are formed from separate laminated annular rings 48 in the above mentioned manner. The outer radius of each annular ring 38, 40, and 42 is the same while the inner radius thereof decreases in the order shown in FIGURE 1. Each of the annular rings 38, 40, and 42 is severed as shown by slot 52 to permit insertion of the rings into the recess 44. When the annular rings 38, 40, and 42 are inserted in recess 44, it is necessary to position the annular rings such that the slots 52 are angularly spaced apart to avoid having a passage through the rings 38, 40, and 42 through which the incandescent gas could migrate.

While the annular rings 38, 40, and 42 heretofore described are specifically designed for use in the environment of a rocket nozzle with its attendant high temperature and high pressure gas, it will be understood that various modifications in the arrangement of layers of graphite and silica cloth, 44 and 46, may be made to meet other applications where ablation resistance and mechanical strength are not equally important. For instance, in a relatively low temperature environment where high pressure gas is involved, the strength characteristics of the laminated annular rings 38, 40, and 42 may be of primary importance in which case only silica cloth layers would be arranged between layers of graphite cloth. In an elevated temperature environment where the gas is at a relatively low pressure, the annular rings 38, 40, and 42 may be composed of a majority of graphite cloth laminations with fewer number of silica cloth laminations. Also, depending upon the life expectancy desired of a baffle of the heretofore mentioned type, the baffle may be composed of only one or possibly more of the annular rings 38, 40, and 42 depending upon operating conditions.

Although only one embodiment of the present invention has been illustrated and described, various changes in the form and relative arrangement of parts may be made to suit requirements without departing from the scope of the present invention.

We claim:

1. A laminated baffle for obstructing the flow of an incandescent gas comprising a plurality of layers of graphite cloth and silica cloth alternately arranged and bonded together to form a laminated structure, said plurality of layers of graphite and silica cloth being arranged in parallel order and rotated about a common central axis to thereby establish equal angular spacing between the warp threads of adjacent layers of graphite and silica cloth.

2. A laminated baffle for obstructing the flow of a pressurized incandescent gas comprising a plurality of layers of resin impregnated graphite cloth and silica cloth alternately arranged and bonded together under heat and pressure to form a laminated structure, said layers of graphite and silica cloth being arranged in parallel order and rotated in their respective planes about a common central axis through a predetermined angle to thereby establish equal angular spacing between the warp threads of adjacent layers of graphite and silica cloth, said predetermined angle being defined substantially by the relationship $180°/N$ where N equals the total number of layers of graphite and silica cloth.

3. A method of making a laminated baffle of the flame barrier type comprising the steps of arranging a plurality of resin impregnated layers of ablation resistant cloth and resin impregnated silica cloth in parallel alternate order beginning with a layer of ablation resistant cloth, rotating each succeeding layer of cloth in its respective plane about a common central axis through a predetermined angle relative to the preceding layer of cloth, subjecting the equal angularly spaced layers of ablation resistant cloth and silica cloth to a pressing operation whereby heat and pressure are applied simultaneously to bond the resin impregnated layers of cloth together, allowing the laminated layers of cloth to cool and finally machining a baffle of desired shape from the laminated layers of cloth.

4. A method of making a laminated baffle for use with a pressurized incandescent gas comprising the steps of arranging a plurality of resin impregnated ablation resistant layers of cloth and high silica content cloth in parallel alternate order beginning with a layer of ablation resistant cloth, rotating each succeeding layer of resin impragnated cloth in its respective plane about a common central axis through a predetermined angle relative to the preceding layer of resin impregnated cloth with the angle of rotation being substantially equivalent to one hundred and eighty degrees divided by the total number of layers of cloth, applying heat and pressure simultaneously to the layers of cloth to bond the layers of cloth together, allowing the laminated layers of cloth to cool, and finally machining a baffle of desired shape from the laminated layers of cloth.

References Cited in the file of this patent

UNITED STATES PATENTS 2,477,407    Grant ------------------ July 26, 1949

FOREIGN PATENTS 2,269    Great Britain ------------------ 1914

OTHER REFERENCES

Chemical Engineering, May 4, 1959, page 70.